(12) United States Patent
Huet et al.

(10) Patent No.: US 10,746,218 B2
(45) Date of Patent: Aug. 18, 2020

(54) FASTENER FOR SECURING A PANEL ON A SUPPORT

(71) Applicant: ILLINOIS TOOL WORKS INC., Glenview, IL (US)

(72) Inventors: Laurent Huet, Meru (FR); Christian Albert Courtin, Vaureal (FR)

(73) Assignee: Illinois Tool Works Inc., Glenview, IL (US)

( * ) Notice: Subject to any disclaimer, the term of this patent is extended or adjusted under 35 U.S.C. 154(b) by 638 days.

(21) Appl. No.: 15/113,133

(22) PCT Filed: Dec. 12, 2014

(86) PCT No.: PCT/US2014/070065
§ 371 (c)(1),
(2) Date: Jul. 21, 2016

(87) PCT Pub. No.: WO2015/116319
PCT Pub. Date: Aug. 6, 2015

(65) Prior Publication Data
US 2017/0002853 A1    Jan. 5, 2017

(30) Foreign Application Priority Data

Jan. 30, 2014    (FR) ...................................... 14 50750

(51) Int. Cl.
*F16B 21/08* (2006.01)
*B60R 13/02* (2006.01)
*F16B 5/06* (2006.01)

(52) U.S. Cl.
CPC ........ *F16B 21/086* (2013.01); *B60R 13/0206* (2013.01); *F16B 5/0628* (2013.01); *F16B 5/0657* (2013.01)

(58) Field of Classification Search
CPC .... F16B 21/086; F16B 5/0628; F16B 5/0657; B60R 13/0206
See application file for complete search history.

(56) References Cited

U.S. PATENT DOCUMENTS

| 1,719,891 | A |   | 7/1929 | Kuhl |
| 2,758,498 | A | * | 8/1956 | Johnson ................ F16B 21/086 411/508 |
| 4,547,937 | A |   | 10/1985 | Collins |

(Continued)

FOREIGN PATENT DOCUMENTS

JP         H07190029         7/1995

OTHER PUBLICATIONS

ISR and WO for PCT/US2014/070065 dated Apr. 9, 2015.

*Primary Examiner* — Ryan J. Walters
(74) *Attorney, Agent, or Firm* — Quarles & Brady LLP

(57) ABSTRACT

The invention relates to a fastener for securing a panel on a support, including:

a securing member including a body delimiting a central recess and including a snapping foot provided with at least two deformable branches protruding relative to the body in a deployed position and being parallel to the direction of the central recess in a folded position, and a rod able to slide in the central recess of the snapping foot between a first position in which the branches are in the deployed position, and a second position in which the folding member acts on the branches to fold them into the folded position.

20 Claims, 6 Drawing Sheets

(56) References Cited

U.S. PATENT DOCUMENTS

| | | | |
|---|---|---|---|
| 5,603,472 A * | 2/1997 | Hutter, III | B64C 1/12 244/132 |
| 5,641,255 A * | 6/1997 | Tanaka | F16B 19/1081 411/45 |
| 2011/0014005 A1 | 1/2011 | Shinozaki | |

* cited by examiner

FASTENER FOR SECURING A PANEL ON A SUPPORT

The present invention relates to a fastener for securing a panel on a support, an assembly including two such fasteners, a method for securing a panel with the aid of the fastener, and a corresponding removal method.

For vehicle users, there is a desire to modify the vehicle according to the user's wishes. More precisely, it is desirable to be able to easily change the passenger compartment of the vehicle.

There is thus a need for a detachable fastener having an external tool which is not visible in the fastening zone, making it possible in particular to modify decorative elements inside the passenger compartment of a vehicle.

To this end, the invention relates to a fastener for securing a panel on a support having a hole with an average radial extension. The fastener includes a securing member including a body delimiting a central recess, the body including a snapping foot provided with at least two deformable branches protruding relative to the body in a deployed position and being parallel to the direction of the central recess in a folded position, the snapping foot having a radial extension smaller than the average radial extension of the hole of the support in the folded position and having a radial extension greater than the average radial extension of the hole of the support in the deployed position. The fastener includes a rod being provided at a first end with a metal element or a magnet and being provided at a second end with a folding member for folding the deformable branches and being mounted sliding in the central recess of the snapping foot between a first position in which the branches are in the deployed position, and a second position in which the folding member acts on the branches to fold them into the folded position.

In accordance with particular embodiments, the fastener includes one or more of the following features, taken individually or in any of the technically possible combinations:

the average radial extension of the hole of the support is smaller than or equal to 20 millimeters, preferably smaller than or equal to 10 millimeters.

the recess emerges on both sides of the body.

the two branches are symmetrical on either side of the recess.

the folding member of the branches includes tie bars.

the folding member for the branches includes a first guide part and a second cylindrical part with an elliptical base, the first guide part being a truncated cone.

the body comprises a head, the head includes a plate to which the snapping foot is attached, a shim and a barrel connecting the plate to the shim, the shim including a plate cover formed by a rigid hub, a rim and multiple flexible arms each connecting the rim to the plate cover, the shim being configured to be inserted into a recess formed in a thickness of said panel and the barrel being configured to be received in a bridge of said panel opening on the recess, each flexible arm including a first curved segment, a second curved segment, and an elbow connecting the first curved segment to the second curved segment, the first curved segment being connected to said plate cover by a first end of the flexible arm and the second curved segment being connected to the rim by a second end of the flexible arm that is opposite its first end, the plate cover and each flexible arm being configured so that the distance between the center of the plate cover and the second curved segment increases along the second curved segment, from the elbow to the rim.

said plate cover and each of said flexible arms are also configured such that the distance between the center of said plate cover and said first curved segment decreases along said first curved segment, from said plate cover to said elbow, when said flexible arm is in a rest configuration in which it is not deformed.

said rim is peripheral and extends, in section, in the shape of a circle having a first center, and said second curved segment of each of said flexible arms extends, in section, in the shape of the arc of a circle having a second center different from said first center.

said rim is peripheral and extends, in section, in the shape of a circle having a first center, and said first curved segment of each of said flexible arms extends, in section, in the shape of the arc of a circle having a third center different from said first center.

said elbow of each of said flexible arms is a hairpin bend and each of said flexible arms is configured such that said first segment extends circumferentially from said plate cover as far as said elbow in a first direction and said second segment extends circumferentially from said elbow as far as said rim in a second direction opposite said first direction.

said flexible arms are arranged in succession and are distributed evenly around said plate cover and each of said flexible arms is configured such that the elbow thereof is arranged radially facing said second end of the preceding said flexible arm.

said flexible arms are arranged in succession and are distributed evenly around said plate cover and each of said flexible arms is configured such that the elbow thereof is disposed circumferentially facing said first end of the preceding said flexible arm when each of said flexible arms is in a rest configuration, in which it is not deformed, and moves away from or closer to said first end of said preceding flexible arm when each of said flexible arms is in a working configuration, in which it is deformed.

each of said flexible arms is configured such that the elbow thereof, in said working configuration, moves away until it comes into contact with said rim or moves closer until it comes into contact with said plate cover.

said plate cover includes a plurality of rigid legs protruding radially from an outer face of said plate cover, with each of said flexible arms which is connected via the first end thereof to a respective one of said rigid legs.

said plate cover and said flexible arms are configured such that said second segment of each of said flexible arms is disposed at a distance from said respective rigid leg to which each of said flexible arms is connected, when each of said flexible arms is in said rest configuration.

said plate cover and said flexible arms are configured such that said second segment of each of said flexible arms moves away from or closer to said respective rigid bar to which each of said flexible arms is connected, when each of said flexible arms is in said working configuration.

each of said rigid legs has a first thickness and each of said flexible arms has a second thickness smaller than said first thickness.

said first segment of each of said flexible arms has a first length and said second segment of each of said flexible arms has a second length greater than at least 1.5 times said first length.

The invention also relates to an assembly including a panel provided with at least two fasteners as described above and a single handling element of the panel comprising one disassembly magnet per fastener.

In addition, the invention relates to a method for fastening a panel on a support having a hole comprising a step for inserting at least one fastener as described above in a housing of the panel and a step for clipping the fastener to the support in the first position.

The invention also relates to a method for removing a panel provided with at least one fastener as described above on a support having a hole comprising a step for switching the rod of the fastener from the first position to the second position.

Further features and advantages of the invention will become clear upon reading the following description of embodiments of the invention, given solely by way of example and with reference to the drawings, in which.

Figure 1:
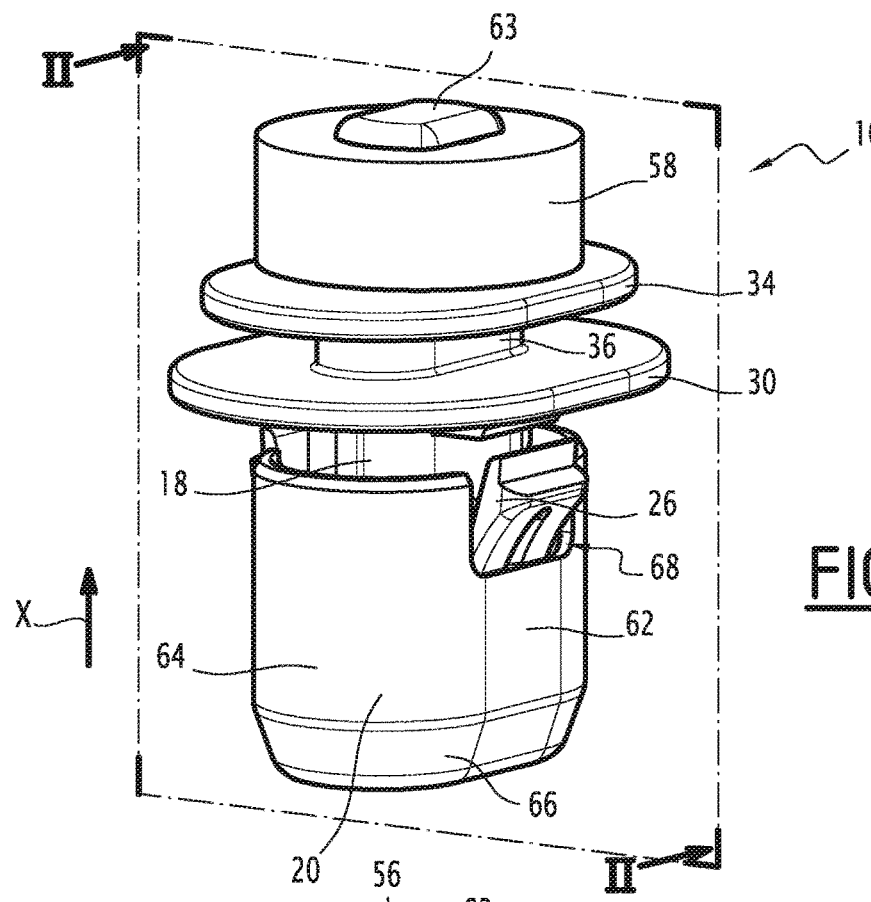
FIG. 1 shows a perspective view of an exemplary fastener in accordance with a first embodiment.
Figure 2:
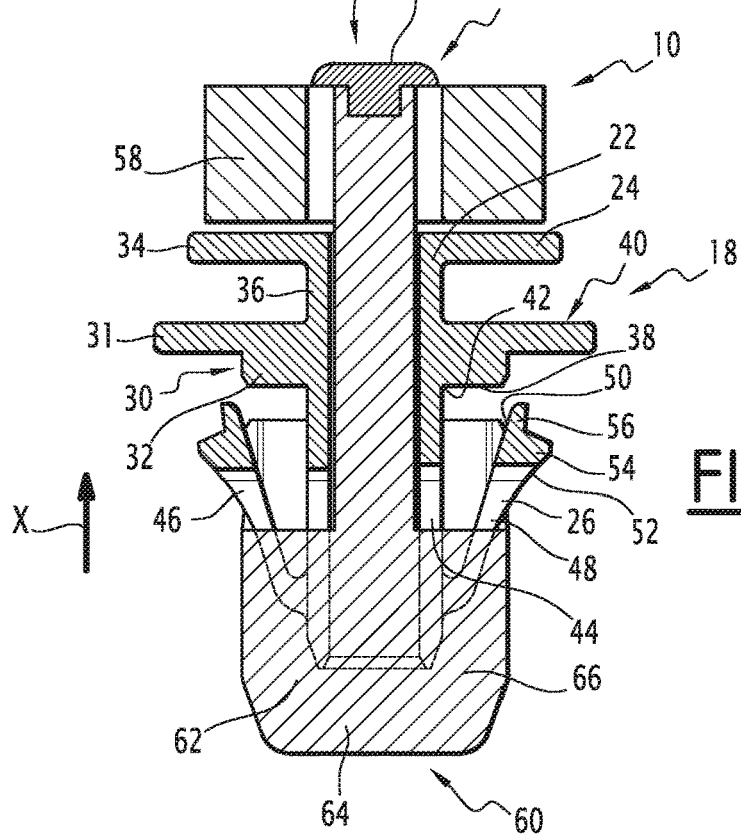
FIG. 2 shows a sectional view along the plane II-II indicated in FIG. 1 of the fastener in accordance with the first embodiment.

As can be seen in FIGS. 1 and 2, a fastener 10 for securing a panel 12 on a support 14 comprising a hole 16 is proposed.

By way of example, the panel 12 is a trim panel for a vehicle door and the support 14 is formed by a sheet metal body panel of the vehicle door.

The hole preferably has an average radial extension less than 20 millimeters (mm), preferably less than 10 mm.

By definition, the average radial extension is the arithmetic mean of the maximum radial extension of the hole and of the minimal radial extension of the hole.

In the case of a round hole, the average radial extension is the value of the diameter. In this case, the average radial extension is often usually equal to 8.2 mm.

In the case of an oblong hole, the maximum radial extension of the hole for example is 20.2 mm, whereas the minimum radial extension of the hole is 12.2 mm. In this particular example, the average radial extension is 16.2 mm.

The fastener 10 extends predominantly along a first axial direction denoted X.

The fastener 10 includes a securing member 18 and a rod 20.

The securing member 18 includes a body 22 provided with a head 24 and a snapping foot 26.

The securing member 18 is preferably made of plastic.

The body 22 delimits a central recess 28 extending in the first axial direction X.

As can be seen in FIG. 2, the recess 28 emerges on both sides of the body 22.

The head 24 includes a plate 30 including an upper platform 31 and a heel 32, a shim 34 and a barrel 36 connecting the plate 30 to the shim 34.

The upper platform 31 and the heel 32 of the plate 30, the shim 34 and the barrel 36 are coaxial with one another and have a generally circular shape.

The plate 30 includes a lower face 38 and an upper face 40 opposite the lower face 38.

The diameter of the upper platform 31 is greater than the diameter of the heel 32.

The shim 34 has a predetermined and constant height.

The head 24 and the snapping foot 26 are connected via a junction 42, which is formed on the lower face 38 of the plate 32 of the head 24. The junction 42 has an annular shape.

The snapping foot 26 includes a rigid core 44, which protrudes from the lower face 30 of the plate 32 at the height of the junction 42. As can be seen in FIG. 2, the rigid core 44 delimits a portion of the recess 28.

The snapping foot 26 extends from the junction 42 as far as a free end in the form of a point, and the rigid core 44 extends in the first axial direction X between this junction 42 and this free end.

The snapping foot 26 comprises two deformable branches 46, 48.

In accordance with the example of FIG. 2, the two branches 46, 48 are curved.

The two branches 46, 48 are deformable between two positions: a deployed position and a folded position.

In the deployed position, the two deformable branches 46, 48 protrude with respect to the edges of the recess 28. More precisely, the two branches 46, 48 each protrude from the rigid core 44 transversely with respect to the axial direction of the core 44.

In the deployed position, the snapping foot 26 has a radial extension greater than the average radial extension of the hole 16 of the support 14. By definition, the radial extension of the snapping foot 26 is the greatest dimension of the snapping foot 26 along a direction perpendicular to the first axial direction X. In the deployed position, it is possible to clip the snapping foot 26 into the support 14.

In the folded position, the two branches 46, 48 are parallel to the general direction of the central recess 28, that is to say the two branches 46, 48 run in the first axial direction X.

In the folded position it is possible to extract the snapping foot 26 in the hole 16 of the support 14, the radial extension of the snapping foot 26 being less than the average radial extension of the hole 16 of the support 14.

Each branch 46, 48 has an inner face 50 and an outer face 52, the inner face 50 facing the core 44. The outer face 52 has a protrusion 54 at the end 56 opposite the free end. Each branch 46, 48 thus has a thickness that is constant on the whole, except at the protrusion 54, where there is a relatively significant increase of the thickness of the branch 46, 48. The distribution of the thickness of the branches 46, 48 allows said branches to deform resiliently.

As shown in FIG. 2, the two branches 46, 48 are symmetrical with respect to the general direction of the central recess 28, that is to say the first axial direction X.

The rod 20 is provided at a first end 56 with a magnet 58 and at a second end 60 with a folding member 62 for folding the deformable branches 46, 48.

The magnet 58 is substantially cylindrical.

According to the example of FIG. 1, the magnet 58 is attached to the rod 20 by snap riveting, the snap rivet 63 being visible in particular in FIGS. 1 and 2. A snap rivet is obtained by fusion of a plastics material. This makes it possible to render the connection between the magnet 58 and the rod 20 permanent.

In a variant, instead of a magnet 58, the rod 20 is provided at the first end with a metal element.

The folding member 62 includes a first guide part 64 and a second cylindrical part 66.

The first guide part 64 is a truncated cone having a reduced extension along the first axial direction X with respect to the extension of the second cylindrical part 66, such that the first guide part 64 forms a chamfer of the second cylindrical part 66.

As can be seen in FIG. 1, the second cylindrical part 66 has an elliptical base.

The second cylindrical part 66 also defines two seats 68, 70 for receiving the branches 46, 48 at least in part when the branches 46, 48 are in the deployed position.

The two seats 68 and 70 are substantially rectangular.

The two seats 68 and 70 face one another.

The rod 20 is mounted sliding in the recess 28, such that the rod 20 is able to slide in the central recess 28 relative to the body 22 between two positions: a first position and a second position.

In the first position, the branches 46, 48 are in the deployed position. As explained before, the branches 46, 48 are then received in the two seats 68 and 70 respectively of the second cylindrical part 66.

In the second position the folding member 62 folds on the branches 46, 48 in order to fold said branches into the folded position.

The function of the fastener 10 is now described with reference to FIGS. 3 to 6, which illustrate a method for removing the panel on the support 14.

Figure 3:
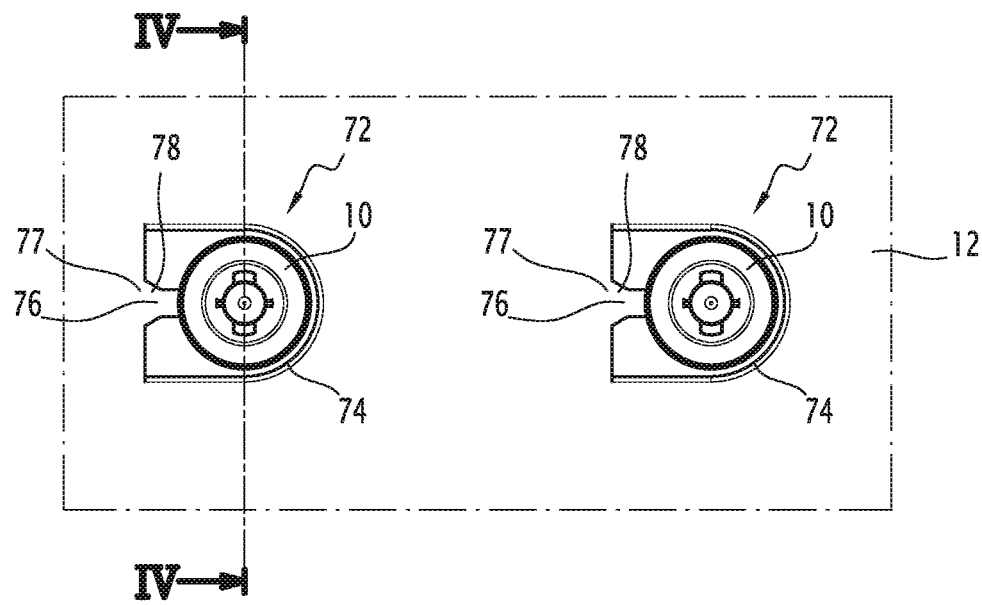
FIG. 3 shows a plan view of the fastener of FIG. 1 inserted in a panel.

FIG. 3 shows the panel 12 illustrated in part with two fasteners 10, which are secured here on said panel, whereas the support 14 is not visible in this figure.

The panel 12 has a bridge 72 formed in the thickness of the panel 12.

The bridge 72 has a rounded part 74 having a cavity 75 with a diameter slightly greater than the diameter of the shim 34, and an elongate part connected to the rounded part 74 and having a width corresponding approximately to the diameter of the barrel 36. The bridge 72 has a depth equal to the height of the barrel 36.

The elongate part 76 of the bridge 72 includes an insertion part 77 and a groove 78. The extension of the insertion part 77 in the plane of the panel 12 decreases steadily as the insertion part 77 is passed through longitudinally toward the groove 78.

Figure 4:
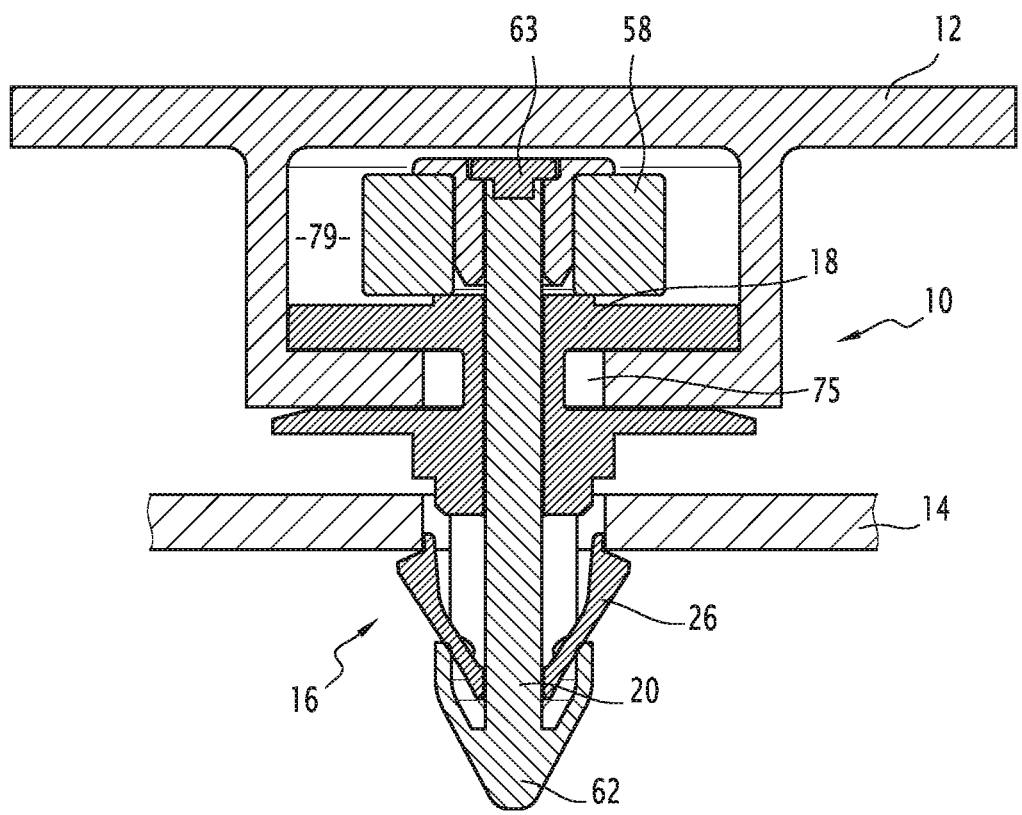
FIGS. 4 to 6 show sectional views along the plane IV-IV indicated in FIG. 3 of the fastener of FIG. 1 in different operating positions during a process of removing the panel secured by the fastener on a support.
Figure 5:
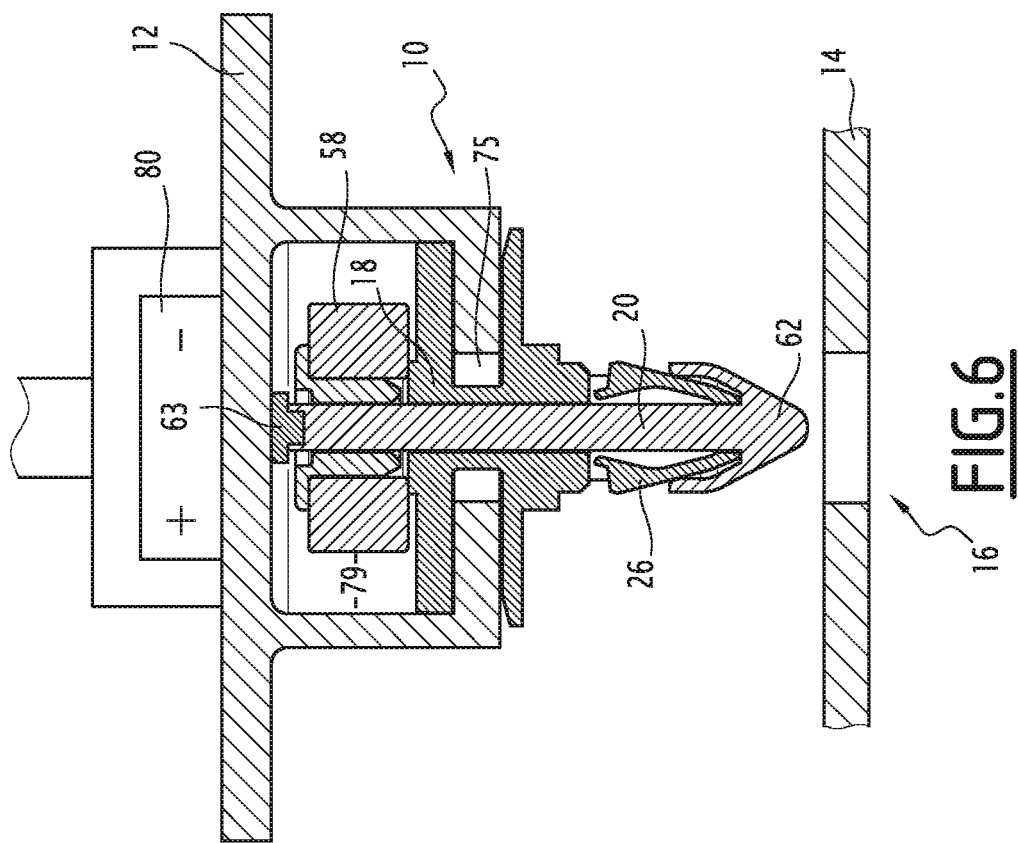
Figure 6:
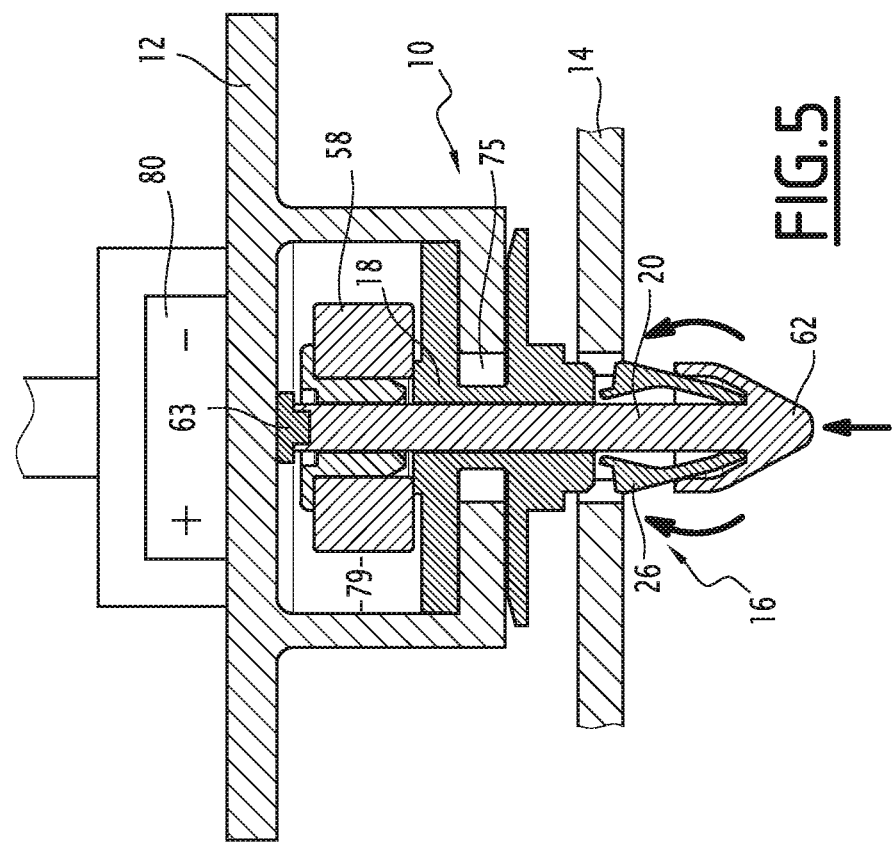

The bridge 72 opens onto a cavity 79, which can be seen in FIG. 4 and is wider than the bridge 72 and has a depth greater than the height of the shim 34. The cavity 79 of the panel 12 is configured to receive the shim 34 whilst the plate 30 and the snapping foot 26 of the fastener 10 remain outside the panel 12.

To position the fastener 10 in the panel 12, the head 24 of the body 22 is inserted into the cavity 79 of the panel 12, through the elongate part 76 of the bridge 72, and slides until the shim 34 is located at the height of the cavity 75 of the bridge 72. More precisely, the fastener 10 is slid parallel to the orientation of the elongate part 76 of the bridge 72, such that the barrel 36 engages with the elongate part 76 of the bridge 72.

FIG. 4 illustrates a position in which the panel 12 is fixed to the support 14. In fact, the snapping foot 26 is in the deployed position, which prevents the removal of the panel 12. The branches 46, 48 rest against the edges of the hole 16 of the support 14.

A manipulation element 80 is then placed in the proximity of the magnet 58. Such a manipulation element is, for example, a handle provided at the ends thereof with two magnets.

More generally, when the panel 12 is provided with more than two fasteners 10, the manipulation element 80 includes at least as many ends as fasteners 10, the ends being provided with a magnet and being arranged so as to be able to be positioned facing a fastener 10.

The manipulation element 80 lifts the magnet 58 along the first axial direction X. This causes the rod 20 to lift from the first position toward the second position. As a result, the branches 46, 48 fold inwardly, as indicated by the arrows in FIG. 5.

By pulling the panel upwardly, it is then possible to remove the panel 12 from the support 14 using a single manipulation element 80.

The fastener 10 can thus be removed with an external tool not visible in the securing zone.

FIGS. 7 to 11 illustrate a fastener 10 in accordance with a second embodiment. The fastener 10 according to the second embodiment is similar to the fastener 10 according to the first embodiment. Only the differences are detailed below.

Figure 11:
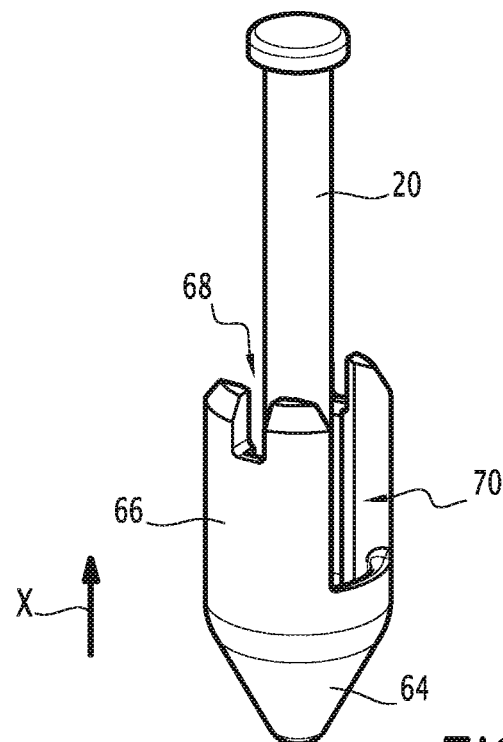
FIG. 11 shows a perspective view of the other portion of the fastener according to FIG. 7.

FIGS. 7 to 10 illustrate the securing member 18 of the fastener 10 in accordance with the second embodiment, whereas FIG. 11 illustrates the rod 20 of the fastener 10 in accordance with the second embodiment.

Figure 8:
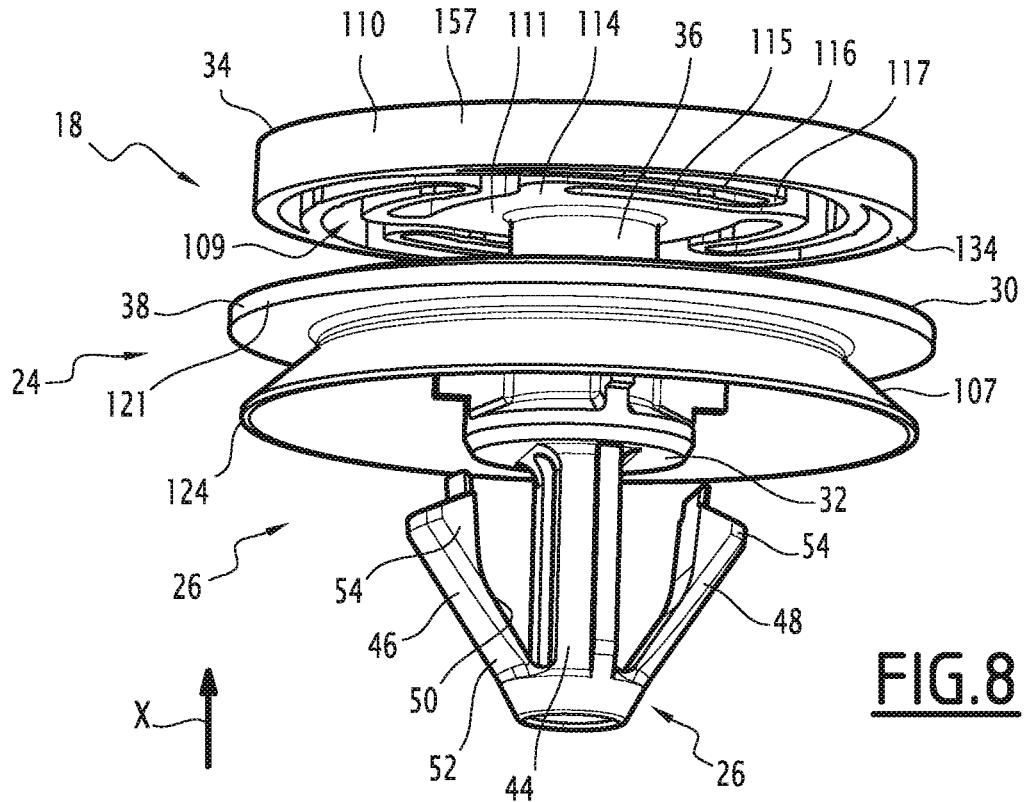

As can be seen in FIG. 8, the head 24 of the securing member 18 includes a sealing flange 107 attached to the plate 30.

The sealing flange 107 is coaxial with the plate 30, the shim 34 and the barrel 36.

The sealing flange 107 is generally circular in shape.

The sealing flange 107 has a ring 121 surrounding the plate 30 and a truncated cone portion extending from the inner face of the plate as far as a free edge 124.

The truncated cone portion of the flange 107 of the head surrounds the junction 42 between the snapping foot 26 and the head 24.

Figure 7:
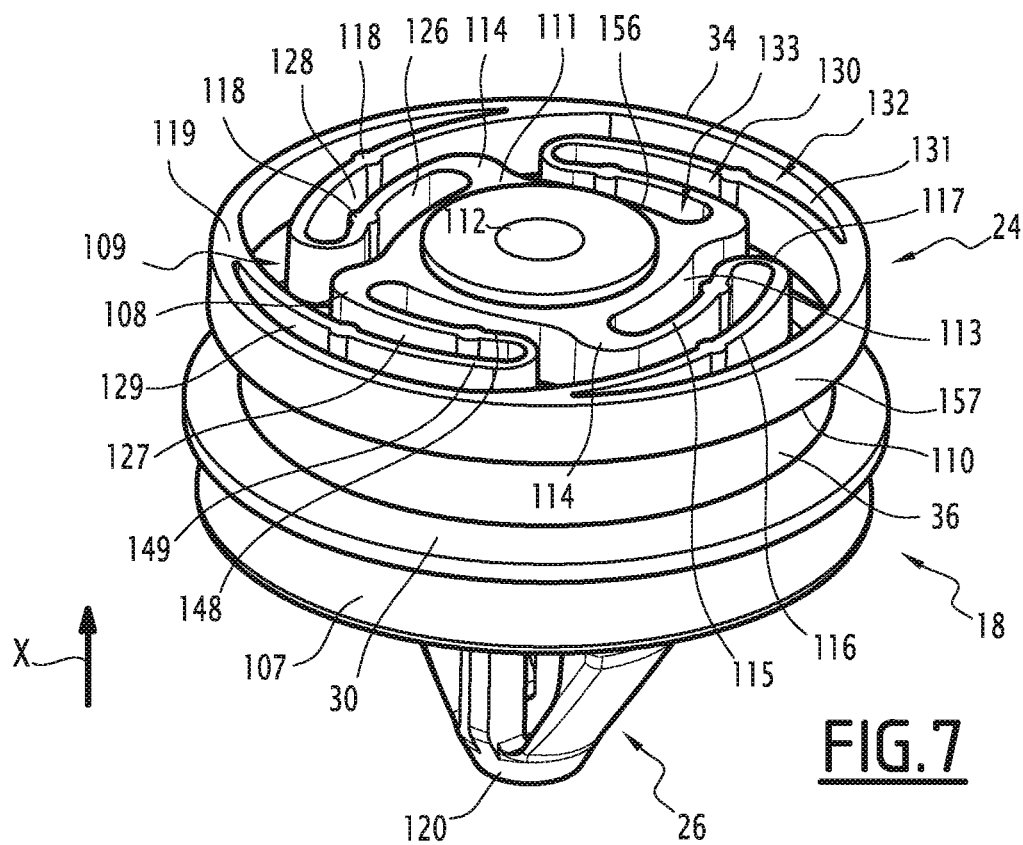
FIGS. 7 and 8 show perspective views of part of a fastener in accordance with a second embodiment.

In the example of FIG. 7, the shim 34 includes a plate cover 111 formed here by a rigid hub, a peripheral and circular rim 110 and four flexible arms 109 connecting the hub 111 to the rim 110.

As before, the shim 34 has a predetermined and constant height (see FIG. 8 in particular).

Figure 9:
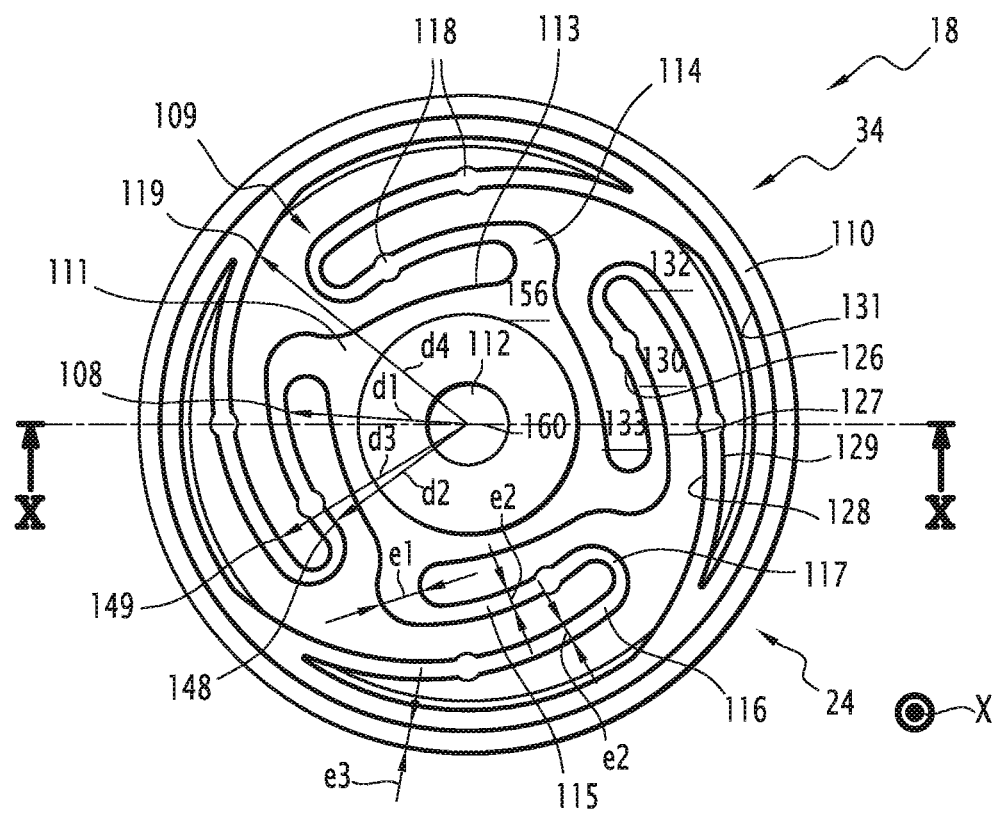
FIG. 9 shows a plan view of a portion of the fastener according to FIG. 7.
Figure 10:
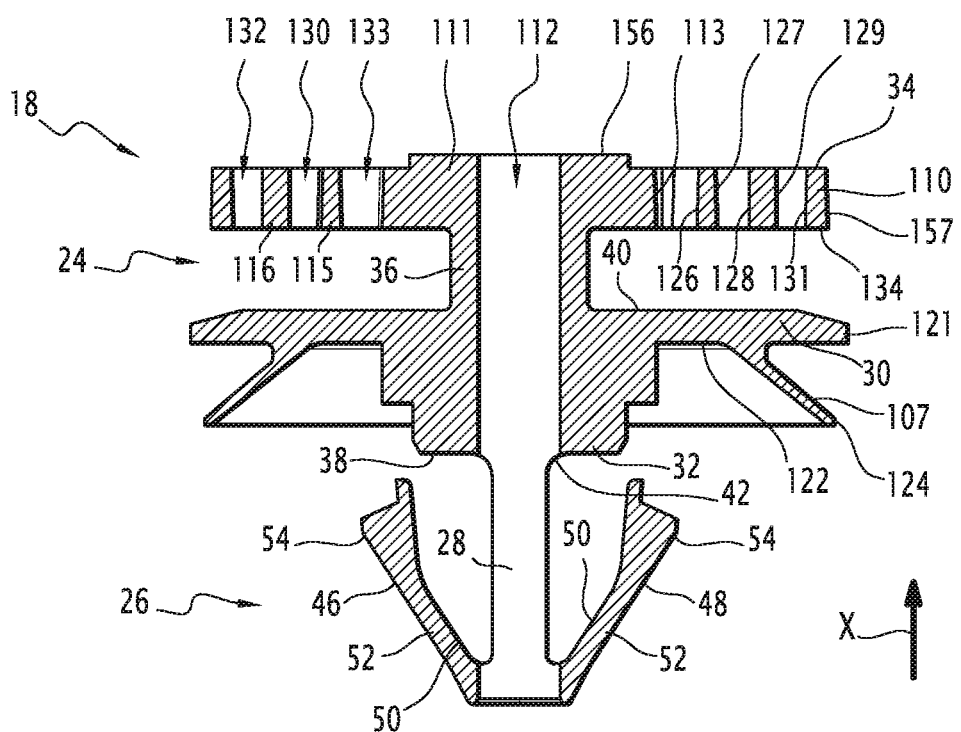
FIG. 10 shows a sectional view along the plane X-X indicated in FIG. 9 of the portion of the fastener.

Here, the hub 111 has, in section, a substantially square shape forming four corners (not shown) and is centered on the axis of the fastener 10 so as to have a center 160 (see FIG. 9).

The hub 111 includes an upper face 156 at which a central circular orifice 112 formed in the hub 111 emerges. This orifice 112 is an extension of a lower part in the hollow of the barrel 36. In addition, this orifice 112 corresponds to a portion of the central recess 28.

The hub 111 also includes an outer lateral face 113 and four rigid legs 114, which each protrude radially from the outer lateral face 113, substantially in line with a respective corner of the four corners.

The four rigid legs 114 have a predetermined thickness e1, which in the present case is in the range [2 mm; 4 mm], and a predetermined length, which in the present case is in the range [2 mm; 3 mm].

The four rigid legs 114 are each configured to form a contact and support zone of the hub 111 and more generally of the shim 36.

The rim 110 extends, in section, in the shape of a circle having a first center coinciding with the center 160 of the hub 111.

The rim 110 includes an inner face 131, an outer face 157 and a lower edge 134 connecting the inner face 131 to the outer face 157.

The rim 110 has a predetermined thickness e3. In the example of FIG. 7, the predetermined thickness e3 is in the range [0.6 mm; 1.2 mm] and is configured so as to be deformable.

The flexible arms 109 are arranged in succession and are distributed evenly around the hub 111.

As can be seen in FIGS. 7 and 9, the shim 34 has a rotational symmetry of a quarter of a turn. Only a single pair formed by a corner of the hub 111 and the corresponding flexible arm 109 is described in detail hereinafter.

The flexible arm 109 includes a first curved segment 115, a second curved segment 116 and an elbow 117 in the form of a hairpin bend, which connects the first segment 115 to the second segment 116.

The first segment 115 has a first end 108 and a second end 148 opposite the first end 108.

The first end 108 is connected to the leg 114 at a first junction (not shown), whereas the second end 148 is connected to the elbow 117.

The first end 108 forms a first end of the flexible arm 109 via which the flexible arm 109 connects to the hub 111.

The first segment 115 extends circumferentially with respect to the hub 111 in a first direction.

The first segment 115 extends, in section, in the shape of the arc of a circle having a center (not shown), also referred to as a second center, different from the center 160 of the hub 111.

The first segment 115 includes an inner concave face 126 disposed facing the outer lateral face 113 of the hub 111, and an outer convex face 127 opposite the inner face 126.

The inner face 126 of the first segment 115 and the outer lateral face 113 of the hub 111 delimit a first space 133 formed between the hub 111 and the flexible arm 109.

The first segment 115 is provided with a protrusion 118 disposed in the vicinity of the second end 148 of said segment.

The second segment 116 has a first end 149 and a second end 119 opposite the first end 149.

The first end 149 is connected to the elbow 117, whereas the second end 119 is connected to the inner face 131 of the rim 110 at a second junction (not shown).

The second end 119 forms a second end of the flexible arm 109 via which the flexible arm 109 connects to the rim 110.

The second segment 116 extends circumferentially with respect to the hub 111 in a second direction opposite the first direction in which the first segment 115 extends.

The second segment 116 extends, in section, in the shape of the arc of a circle having a center (not shown), also referred to as a third center, different from the center 160 of the hub 111.

The center of the arc of a circle defined by the second segment 116 is, as visible in FIGS. 7 and 9, similar to the center of the arc of a circle defined by the first segment 115.

The second segment 116 comprises an inner concave face 128 disposed facing the outer face 127 of the first segment 115, and an outer convex face 129 opposite the inner face 128 and disposed facing the inner face 131 of the rim 110.

The outer face 129 of the second segment 116 and the inner face 131 of the rim 110 delimit a second space 132 formed between the flexible arm 9 and the rim 110.

The outer face 127 of the first segment 115 and the inner face 128 of the second segment 116 delimit a third space 130 formed between the two segments of the flexible arm 109.

The second segment 116 is provided with a protrusion 118 disposed substantially in the middle of the length of said segment, also referred to as the second length.

As can be seen in the figures, each flexible arm 109 is configured such that the respective elbow 117 thereof is disposed radially facing the second end 119 of the preceding flexible arm 109.

The first segment 115 has a length, also referred to as the first length, which is shorter than the second length. In the present case, the length of the second segment 116 is at least 1.5 to 2 times greater than the length of the first segment 115; whereas the first segment 115 and the second segment 116 have a predetermined thickness e2 that is constant on the whole and in the shown example is in the range [0.4 mm; 0.8 mm]. More generally, the flexible arm 109 has a thickness that is constant on the whole.

The thickness e2 of the segments of the flexible arm 109 is far less than the thickness e1 of the rigid leg 114.

The first end 108 of the flexible arm 109 is at a distance d1 from the center 160 of the hub 111, the second end 148 of the first segment 115 is at a distance d2 from the center 160 of the hub 111, the first end 149 of the second segment 116 is at a distance d3 from the center 160 of the hub 111, and the second end 119 is at a distance d4 from the center 160 of the hub 111 (see FIG. 9).

The hub 111 and the flexible arm 109 are configured such that the distance between the center 160 of the hub 111 (passing via the axis of the fastener) and the second curved segment 6 increases along this second curved segment 116 from the first end 149 thereof connecting said second segment to the elbow 117 as far as the second end 119 thereof connecting said second segment to the rim 110. In other words, the distance d4 is greater than the distance d3, and the distance increases along the second segment 116 between d3 and d4.

The fastener 10 described with reference to FIGS. 7 to 10 is in a rest configuration in which neither the flexible arms 109 nor the rim 110 are deformed.

In this rest configuration, the hub 111 and the arms 109 are configured such that the distance between the center 160 of the hub 111 and the first curved segment 115 decreases along the first curved segment 115 from the first end 108 thereof connecting said first segment to the rigid branch 114 of the hub 111 as far as the second end 148 thereof connecting said first segment to the elbow 117. In other words, the distance d1 is greater than the distance d2, and the distance decreases slightly along the first segment 115 between d1 and d2.

In this rest configuration, the hub 111 and the flexible arm 109 are also configured such that the second curved segment 116 of the flexible arm 109 is disposed at a distance from the respective rigid branch 114 to which the second curved portion 116 connects.

In this rest configuration, the flexible arm 109 is also configured such that the elbow 117 thereof is disposed circumferentially facing the first end 108 of the flexible arm 109.

FIG. 11 illustrates a rod 20 of which the first guide part 64 has the shape of a cone instead of a truncated cone as in the case of the first embodiment. As can be seen in FIG. 11, the apex of the cone is preferably slightly rounded.

Furthermore, the extension of the first guide part 64 along the first axial direction X is greater, such that the extension of the first guide part 64 along the first axial direction X is substantially equal to half the extension of the second cylindrical part 66.

The function of the fastener 10 according to the second embodiment is now described. The function is similar to the function of the fastener 10 according to the first embodiment. Only the differences are highlighted.

If the axis of the fastener 10 is not perfectly transverse to the sliding of the panel 12, some parts of the shim 36 may abut against surfaces of the cavity 79 of the panel 12.

However, in practice the sliding is often implemented such that the axis of the fastener 10 is perfectly aligned with the hole of the support 14.

With an error of alignment of the axis of the fastener 10 with respect to the axis of the hole 16, the center 160 of the hub 111 and more generally of the shim 34 is offset with respect to the middle of the cavity 79 in the panel 12. In such a position, the rim 110 deforms to a greater or lesser extent depending on the error of alignment of the axes.

Another equivalent way of wording this problem is to consider that the axis of the fastener 10 has an error of alignment with respect to the axis of the hole 16 of the support 14.

When the correct positioning of the fastener 10 involves a slight deformation, only the second segment 116 of at least one flexible arm 109 bends, independently of the respective first segment 115. If the deformation is greater, the first segment 115 also bends in addition to the second segment 116, such that at least one of the flexible arms 109 deforms substantially over the entire length thereof.

The shim 34, due to the deformation of the flexible arms 109, makes it possible to make up for the play between this shim 34 and the surfaces of the cavity 79 of the panel 12, and also makes it possible not to block the sliding of the shim in the panel 12.

The fastener 10 is then in a working configuration, in which the flexible arms 109 are deformed.

In this working configuration, each flexible arm 109 is configured such that the elbow 117 thereof moves away from or closer to the first end 108 of the preceding flexible arm 109.

More precisely, some flexible arms 109 are configured such that the respective elbow 117 thereof moves away toward, or even until contact with the inner face 131 of the rim; whereas certain other flexible arms 109 are configured such that the respective elbow 117 thereof moves closer to, or even until contact with the outer lateral face 113 of the hub 111.

In this working configuration, the hub 111 and the flexible arms 109 are also configured such that the second segment 116 of each flexible arm 109 moves away from or closer to the respective rigid leg 114 to which each flexible arm 109 connects.

More precisely, some of the flexible arms 109 are configured such that the respective second segment 116 thereof moves away from the respective rigid leg 114, whereas some of the other flexible arms 109 are configured such that the respective second segment 116 thereof moves closer to, or even until contact with the respective rigid leg 114.

Once the sliding is finished, the fastener 10 maintains the forced position in the case of error of alignment of the axis of the fastener 10 and of the axis of the hole 16 of the support 14.

In fact, in the case in which the axis of the fastener 10 and the axis of the hole 16 of the support 14 are the same, the fastener 10 re-centers itself, since the flexible arms 109 and more precisely each of the segments of the latter return to the rest configuration thereof, in which they are not deformed and in which the axis of the fastener 10 is transverse to the panel 12.

The fastener 10 is held in the cavity 79 of the panel 12 by the hub 111, of which the dimensions make it possible to block this fastener 10.

The dimensions of the shim 34 are adjusted to those of the cavity 79 of the panel 12, which makes it possible to avoid noise-producing vibrations and a risk of the panel 12 detaching from the support. Despite the manufacturing tolerances of the panel 12, the fastener 10 and the geometry of the cavity 79 of the panel 12, this adjustment is possible thanks to the presence of the deformable rim 110 and the flexible arms 109 of the shim 34.

The shim 34 inserted into the panel 12 rests via the lower edge 134 of the rim 110 on a contact face of the cavity 79 of the panel 12, and the outer face 157 of the rim 110 bears against the surfaces of the cavity 79 of the panel 12.

It is noted that the rigid legs 114 are each configured to form a contact and support zone of the hub 111 and more generally of the shim, equally as the fastener 10 is slid into the elongate part 76 of the bridge 72 and into the cavity 79 of the panel 12 (fastener 10 in working configuration) and once the shim 34 has been inserted into the panel 12 (fastener 10 in rest configuration). These rigid legs 114 are configured to come to rest on the contact face of the cavity 79 of the panel 12.

If the axis of the fastener 10 is not perfectly transverse to the orientation of the elongate part 76 of the panel 12, the rigid legs 114 retain the shim 34 in the cavity 79 of this panel 12 and thus retain the fastener 10 with the panel 12.

The shim 34 is thus housed in the cavity 79 of the panel 12, and the barrel 36 is located in the cavity 75, whereas the plate 30, the flange 107 and the snapping foot 26 remain outside the panel 12, such that the upper face 40 of the plate 30 faces the outer face of the panel 12.

The fastener 10 and the panel 12 thus form an assembly that is ready to be fixed on the support 14.

The fastener 10 according to the second embodiment enables a substantial deformation of each flexible arm when the fastener 10 is in a working configuration, in which the shim (and therefore the flexible arm) is deformed. Thus, the fastener 10 according to the second embodiment offers a range of displacement of the rim 110 and of the plate cover 111 with respect to one another that is much greater than the range of displacement offered by the fasteners of the prior art.

In other words, the fastener 10 according to the second embodiment has high performances in terms of making up for play between the fastener assembled on the panel 12 and the hole of the support 14 and is therefore particularly convenient for securing a panel 12 to a support 14, even if the axis of the fastener 10, thus the axis of the head 24 of the securing member 18, is offset with respect to the axis of the hole 16 of the support 14.

It should be noted that the plate cover 111 is centered on the axis of the fastener 10, such that the plate cover 111 and the flexible arms 109 are configured such that the distance between the center 160 of said plate cover 111 passing via the axis of the fastener 10 and the second segment increases along this second segment.

It should also be noted that, more precisely, the first segment of each flexible arm 109 has a first end connecting the first segment to the plate cover 111 and a second end opposite the first end and connecting the first segment to the elbow, and the second segment of each flexible arm has a first end connecting the second segment to the elbow and a second end opposite the first end and connecting the second segment to the rim; with the first end of the first segment, which corresponds to the first end of the flexible arm, and with the second end of the second segment, which corresponds to the second end of the flexible arm. Thus, the plate cover 111 and the flexible arms 109 are configured such that the distance between the center 160 of said cover plate 111 passing via the axis of the fastener 10 and the second segment increases along this second segment, from the first end thereof to the second end thereof.

Figure 12:
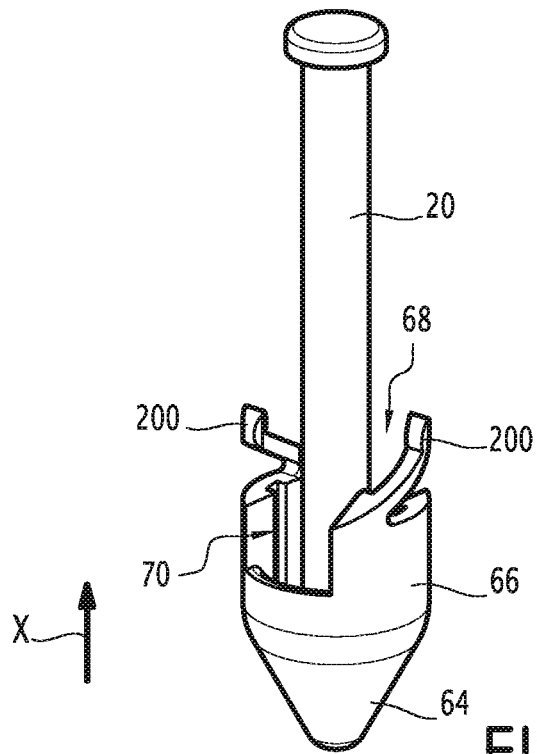
FIG. 12 shows a perspective view of the other portion of the fastener in accordance with a third embodiment.

In accordance with a third embodiment, similar to the second embodiment, only the rod 20 is different, as shown in FIG. 12. In this embodiment, the folding member 62 also comprises tie bars 200.

The tie bars 200 form a single piece with the cylindrical part 66.

The tie bars 200 protrude from the second cylindrical part 66 upwardly. Thus, in accordance with the example of FIG. 12, the tie bars 200 extend circumferentially from an end attached to the cylindrical part 66 to a free end.

The tie bars 200 have the form of a leg and are two in number.

The tie bars 200 are arranged opposite one another.

Each tie bar 200 is arranged between the two seats 68, 70 of the cylindrical part 66. More precisely, the tie bars 200 are at 90° to the two seats 68, 70 of the cylindrical part 66.

Such tie bars 200 make it possible to reduce the vibrations of the fastener 10 during operation, since they come into contact with the heel 32 and deform resiliently so as to absorb the vibrations of the rod 20 with respect to the snapping foot 26.

Further variants (not illustrated) of a removable fastener 10 with an outer tool not visible in the securing zone are also conceivable:

the combination of the above variants, for example a fastener 10 which includes a securing member 18 according to the first embodiment and a rod 20 according to the third embodiment, the shim includes a greater or lesser number of flexible arms, for example three or five;

the shim includes a greater or lesser number of rigid legs, for example three or five, depending on the number of flexible arms, the hub of the shim has, in section, a circular or rectangular or rather square shape, the first segment and the second segment of each flexible arm extend, in section, in the shape of the arc of a circle with the arc of the circle of the first segment having a center different from the center of the arc of the circle of the second segment, the panel includes keyhole grooves provided with a cutout transverse to the elongate part, in which cutout the fastener is wedged, the snapping foot of the fastener has, for example, three of four branches rather than two;

the fastener is not formed in just one molded part, but in two separate parts, which are connected to one another.

It is noted more generally that the invention is not limited to the described and illustrated examples.

The invention claimed is:

1. A fastener for securing a panel on a support having a hole with an average radial extension, the fastener including:
   a securing member including a body delimiting a central recess, the body including a snapping foot provided with at least two deformable branches protruding relative to the body in a deployed position and being parallel to the direction of the central recess in a folded position, the snapping foot having a radial extension smaller than the average radial extension of the hole of the support in the folded position and having a radial extension greater than the average radial extension of the hole of the support in the deployed position, and
   a rod being provided at a first end thereof with a metal element or a magnet and being provided at a second end of the rod with a folding member for folding the deformable branches and being mounted sliding in the central recess of the snapping foot between a first position in which the branches are in the deployed position and in contact with the folding member, and a second position in which the folding member acts on the branches to fold them into the folded position.

2. The fastener according to claim 1, wherein the average radial extension of the hole of the support is smaller than or equal to 20 millimeters.

3. The fastener according to claim 1, wherein the central recess emerges on both sides of the body.

4. The fastener according to claim 1, wherein the two branches are symmetrical on either side of the recess.

5. The fastener according to claim 1, wherein the folding member of the branches includes tie bars.

6. The fastener according to claim 1, wherein the folding member for the branches includes a first guide part and a second cylindrical part with an elliptical base, the first guide part being a truncated cone.

7. The fastener according to claim 1, wherein the body comprises a head, the head includes a plate to which the snapping foot is attached, a shim and a barrel connecting the plate to the shim, the shim including a plate cover formed by a rigid hub, a rim and multiple flexible arms each connecting the rim to the plate cover, the shim being configured to be inserted into a recess formed in a thickness of said panel and the barrel being configured to be received in a bridge of said panel opening on the recess, each flexible arm including a first curved segment, a second curved segment, and an elbow connecting the first curved segment to the second curved segment, the first curved segment being connected to said plate cover by a first end of the flexible arm and the second curved segment being connected to the rim by a second end of the flexible arm that is opposite its first end, the plate cover and each flexible arm being configured so that the distance between the center of the plate cover and the second curved segment increases along the second curved segment, from the elbow to the rim.

8. The fastener according to claim 1, wherein the rod is movable relative to the securing member to fold the deformable branches, and wherein resistance to movement of the rod in a direction that folds the deformable branches is resisted by the two deformable branches.

9. A device, comprising:
   a fastener for securing a panel on a support having a hole with an average radial extension, the fastener including:
      a body delimiting a central recess, the body including a snapping foot provided with at least two deformable branches protruding obliquely relative to the body in a deployed position and being less oblique relative to the direction of the central recess in a folded position, the snapping foot having a radial extension smaller than the average radial extension of the hole of the support in the folded position and having a radial extension greater than the average radial extension of the hole of the support in the deployed position, and a rod apparatus, the rod apparatus including a metal element or a magnet and including a folding member for folding the deformable branches and being mounted sliding in the central recess of the snapping foot between a first position in which the branches are in the deployed position, and a second position in which the folding member acts on the branches to fold them into the folded position, wherein the fastener includes a head portion configured for securing the panel between two surfaces of the head portion.

10. The device according to claim 9, wherein the average radial extension of the hole of the support is smaller than or equal to 20 millimeters.

11. The device according to claim 9, wherein the central recess emerges on both sides of the body.

12. The device according to claim 9, wherein the two branches are symmetrical on either side of the central recess.

13. The device according to claim 9, wherein the folding member for the branches includes a first guide part and a second cylindrical part with an elliptical base, the first guide part being a truncated cone.

14. The device according to claim 9, wherein the rod apparatus includes the metal element.

15. The device according to claim 9, wherein the rod apparatus includes the magnet.

16. The device according to claim 1, wherein the average radial extension of the hole of the support is smaller than or equal to 10 millimeters.

17. The device according to claim 9, wherein the average radial extension of the hole of the support is smaller than or equal to 10 millimeters.

18. The device according to claim 9, wherein the device is configured such that the metal element or the magnet can move in a first axial direction relative to the body, so as to lift the rod apparatus from the first position towards the second position and thus fold the branches inward.

19. The device according to claim 9, wherein:

wherein the fastener is configured such that the rod moves relative to the body, thus creating a tensile force that moves the folding member towards the head portion, wherein the tensile force is transmitted through the body inside the central recess, wherein the rod apparatus includes the magnet, and movement of the magnet results in movement of the rod.

20. A device, comprising:

a fastener for securing a panel on a support having a hole with an average radial extension, the fastener including:

a body delimiting a central recess, the body including a means for snapping, the means for snapping having a radial extension smaller than the average radial extension of the hole of the support in a folded position of the means for snapping and having a radial extension greater than the average radial extension of the hole of the support in the deployed position of the means for snapping, and an apparatus, the apparatus including a magnet and including a means for folding for folding the means for snapping and being mounted sliding in a central recess of the means for snapping between a first position in which the means for snapping is in the deployed position, and a second position in which the means for folding acts on the means for snapping to fold the means for snapping into the folded position, wherein movement of the magnet results in movement of the apparatus, and wherein the fastener includes a head portion configured for securing the fastener to the panel.

\* \* \* \* \*